(12) United States Patent
Marlow

(10) Patent No.: US 12,274,959 B2
(45) Date of Patent: Apr. 15, 2025

(54) DEGASSING CHAMBER FOR AN OZONE SOLUTION SYSTEM

(71) Applicant: Liquid 03, LLC, Omaha, NE (US)

(72) Inventor: Evan D. Marlow, Omaha, NE (US)

(73) Assignee: Liquid O3, LLC, Omaha, NE (US)

( * ) Notice: Subject to any disclaimer, the term of this patent is extended or adjusted under 35 U.S.C. 154(b) by 0 days.

(21) Appl. No.: 18/401,947

(22) Filed: Jan. 2, 2024

(65) Prior Publication Data

US 2024/0216835 A1    Jul. 4, 2024

Related U.S. Application Data

(63) Continuation of application No. 17/086,592, filed on Nov. 2, 2020, now Pat. No. 11,890,554.

(51) Int. Cl.
| | |
|---|---|
| *C02F 1/78* | (2023.01) |
| *B01D 19/00* | (2006.01) |
| *B01F 23/23* | (2022.01) |
| *B01F 23/232* | (2022.01) |
| *B01F 25/31* | (2022.01) |
| *C01B 13/02* | (2006.01) |
| *C11D 3/39* | (2006.01) |
| *B01F 23/237* | (2022.01) |

(52) U.S. Cl.
CPC ......... *B01D 19/0063* (2013.01); *B01D 19/00* (2013.01); *B01F 23/23* (2022.01); *B01F 23/232* (2022.01); *B01F 25/31* (2022.01); *C01B 13/0203* (2013.01); *C02F 1/78* (2013.01); *C11D 3/3942* (2013.01); *C11D 3/3947* (2013.01); *B01F 23/237613* (2022.01)

(58) Field of Classification Search
CPC ..... B01D 19/0063; B01D 19/00; B01F 23/23; B01F 23/232; B01F 25/31; C01B 13/0203; C02F 1/78; C11D 3/3942; C11D 3/3947

See application file for complete search history.

(56) References Cited

U.S. PATENT DOCUMENTS 5,397,461 A * 3/1995 Augustin .............. F16K 24/044
                                                        137/430

* cited by examiner

*Primary Examiner* — Robert A Hopkins
(74) *Attorney, Agent, or Firm* — Barclay Damon LLP

(57) ABSTRACT

A degassing chamber for an ozone solution system includes a cylindrical housing defining a cavity. A mixture of water and ozone gas is delivered to the cavity, the mixture containing excess ozone gas. A cylindrical float is positioned centrally within the cavity to rise in accordance with the mixture column within the cavity. A piston is connected to move in accordance with the float. When the mixture level rises above a threshold, the piston the piston moves upward and seals an ozone outlet. As a pressure of ozone gas in the degassing chamber increases, the float is forced downward causing the piston to open a channel to an upper ozone outlet through which excess ozone gas is released. After removal of excess ozone gas, a mixture of water and ozone gas is output from the degassing chamber which is suitable for use as a general purpose cleaner.

20 Claims, 11 Drawing Sheets

DEGASSING CHAMBER FOR AN OZONE SOLUTION SYSTEM

CROSS-REFERENCE TO RELATED APPLICATION

This application is a Continuation of U.S. patent application Ser. No. 17/086,592, filed on Nov. 2, 2020, entitled, "DEGASSING CHAMBER FOR AN OZONE SOLUTION SYSTEM." The entire contents of this patent application is incorporated by reference herein.

FIELD OF THE TECHNOLOGY

The subject disclosure relates to systems for creating water and ozone gas solutions, and more particularly to degassing chambers for such systems.

BACKGROUND OF TECHNOLOGY

Various solutions are used for general purpose cleaning. Solutions of ozone gas and water have been found to be particularly advantageous as a sanitary and effective solution, which can serve as an alternative to traditional chemical solutions which can be toxic and/or not environmental friendly. Creating an ozone solution that can serve as a general purpose cleaner requires a system which can adequately mix water and ozone gas.

Normally, ozone solution systems provide a mixing stage where water and ozone gas are mixed to create the ozone solution. Water has a saturation point, however, at which point more ozone gas can't be dissolved in the water. Nevertheless, to ensure saturation of the water with ozone gas, the water is normally mixed with more ozone gas than would be required to reach the saturation point. This results in the release of some excess ozone gas from the water and ozone gas solution after mixing. But the release of significant excess ozone gas is undesirable for a number of reasons. For example, OSHA has strict regulations on exposure limits for ozone gas which are very easy to exceed.

One way to avoid the release of excess ozone gas is to include a degassing chamber with the system. However, effectively implementing a degassing chamber within such a system has proven difficult. In particular, it is desirable for the system to handle a significant flowrate. A degassing chamber that requires a long retention time, or is otherwise unable to quickly remove excessive ozone from the system, can have a significant negative impact on the system's ability to maintain a desired flowrate. Further, failure of the degassing chamber can lead to the inability to safely remove excess ozone gas. As such, there is a need for an improved degassing chamber.

SUMMARY OF THE TECHNOLOGY

In light of the needs described above, in at least one aspect, the subject technology relates to a degassing chamber for a water and ozone solution system. The chamber includes a housing having a cylindrical sidewall defining a cavity between an upper end and a lower end. The cavity includes a mixture area proximate the lower end and an ozone area proximate the upper end. An inlet is configured to deliver a mixture of water and ozone gas to the mixture area through the lower end. A cylindrical float is positioned within the cavity and configured to move along a central axis of the cavity. The cylindrical float is buoyant with respect to the mixture. The mixture forms a column around the cylindrical float and excess ozone gas from the mixture is directed past the cylindrical float to pool within the ozone area. An ozone outlet is configured to divert ozone gas from the ozone area out the upper end. A piston is connected to the cylindrical float to move simultaneously with the cylindrical float. When the column of the mixture rises above a threshold, the piston moves into a closed position in which the piston seals the ozone outlet. When the column of the mixture is below the threshold, the piston moves into an open position in which the piston allows ozone gas from the ozone area to exit through the ozone outlet. A mixture outlet is configured to divert the mixture from the mixture area and out the lower end. The degassing chamber is configured such that an ozone gas pressure builds up in the ozone region over time such that the column of the mixture is eventually driven downward by the ozone gas pressure.

In at least one aspect, the subject technology relates to an ozone solution system. The system includes a single water input line configured to route water into the ozone solution system. A single air intake is configured to route air into the into the ozone solution system. One or more air treatment stages are configured to treat the air and generate ozone gas. One or more water treatment stages are configured to mix the water with the ozone gas to create a mixture of water and ozone gas. The system includes a degassing chamber. The degassing chamber includes a housing having a cylindrical sidewall defining a cavity between an upper end and a lower end. The cavity includes a mixture area proximate the lower end and an ozone area proximate the upper end. An inlet is configured to deliver a mixture of water and ozone gas to the mixture area through the lower end. A cylindrical float is positioned within the cavity and configured to move along a central axis of the cavity. The cylindrical float is buoyant with respect to the mixture. The mixture forms a column around the cylindrical float and excess ozone gas from the mixture is directed past the cylindrical float to pool within the ozone area. An ozone outlet is configured to divert ozone gas from the ozone area out the upper end. A piston is connected to the cylindrical float to move simultaneously with the cylindrical float. When the column of the mixture rises above a threshold, the piston moves into a closed position in which the piston seals the ozone outlet. When the column of the mixture is below the threshold, the piston moves into an open position in which the piston allows ozone gas from the ozone area to exit through the ozone outlet. A mixture outlet is configured to divert the mixture from the mixture area and out the lower end. The degassing chamber is configured such that an ozone gas pressure builds up in the ozone region over time such that the column of the mixture is eventually driven downward by the ozone gas pressure. The system also includes a single mixture output line configured to route the mixture from the degassing chamber out of the ozone solution system.

In some embodiments, the degassing chamber has a divider connected to the lower end and positioned to divert water towards the cylindrical float, the divider blocking a direct path between the inlet and mixture outlet. In some embodiments, the lower end of the housing has a cylindrical bottom cap having a diameter greater than a diameter of the cylindrical sidewall. The cylindrical bottom cap can include a lower groove, wherein a lower end of the cylindrical sidewall is seated within the lower groove. An upper end of the housing can include a cylindrical top cap having a diameter greater than the diameter of the cylindrical sidewall. The cylindrical top cap can include an upper groove, wherein an upper end of the cylindrical sidewall is seated within the upper groove. In some cases, a lower O-ring is positioned within the lower groove to seal the lower end of the cylindrical sidewall to the cylindrical bottom cap. An upper O-ring can also be positioned within the upper groove to seal the upper end of the cylindrical sidewall to the cylindrical top cap. In some embodiments, a piston housing is positioned within the cavity and centrally attached to the top cap around the ozone outlet. The piston housing can include a piston skirt configured to guide the piston along the central axis. The piston housing can also include a plurality of side openings into the piston housing, the side openings providing a channel between the ozone area and the ozone outlet when the piston is in the open position. The piston can be configured to seal the side openings in the closed position. The piston can also include a plurality of set screws extending orthogonal to the central axis and into the side openings of the piston housing, the set screws restricting movement of the cylindrical float within a range along the central axis.

In some embodiments, the degassing chamber includes a connecting rod extending along the central axis between the cylindrical float and the piston, the connecting rod rigidly connecting the cylindrical float and piston. The cylindrical float can buoyant such that the cylindrical float rises when the mixture reaches a midway point of the cylindrical float. In some embodiments, the degassing chamber includes an ozone destruct. The ozone outlet can divert ozone gas from ozone area to the ozone destruct, the ozone destruct containing a destruct catalyst. The ozone destruct can be configured to break down the ozone gas with the destruct catalyst and release oxygen. The inlet can include a raised lip extending into the cavity and configured to guide the mixture into the cavity. The bottom cap can include a sloped cutout configured to direct mixture to the outlet.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
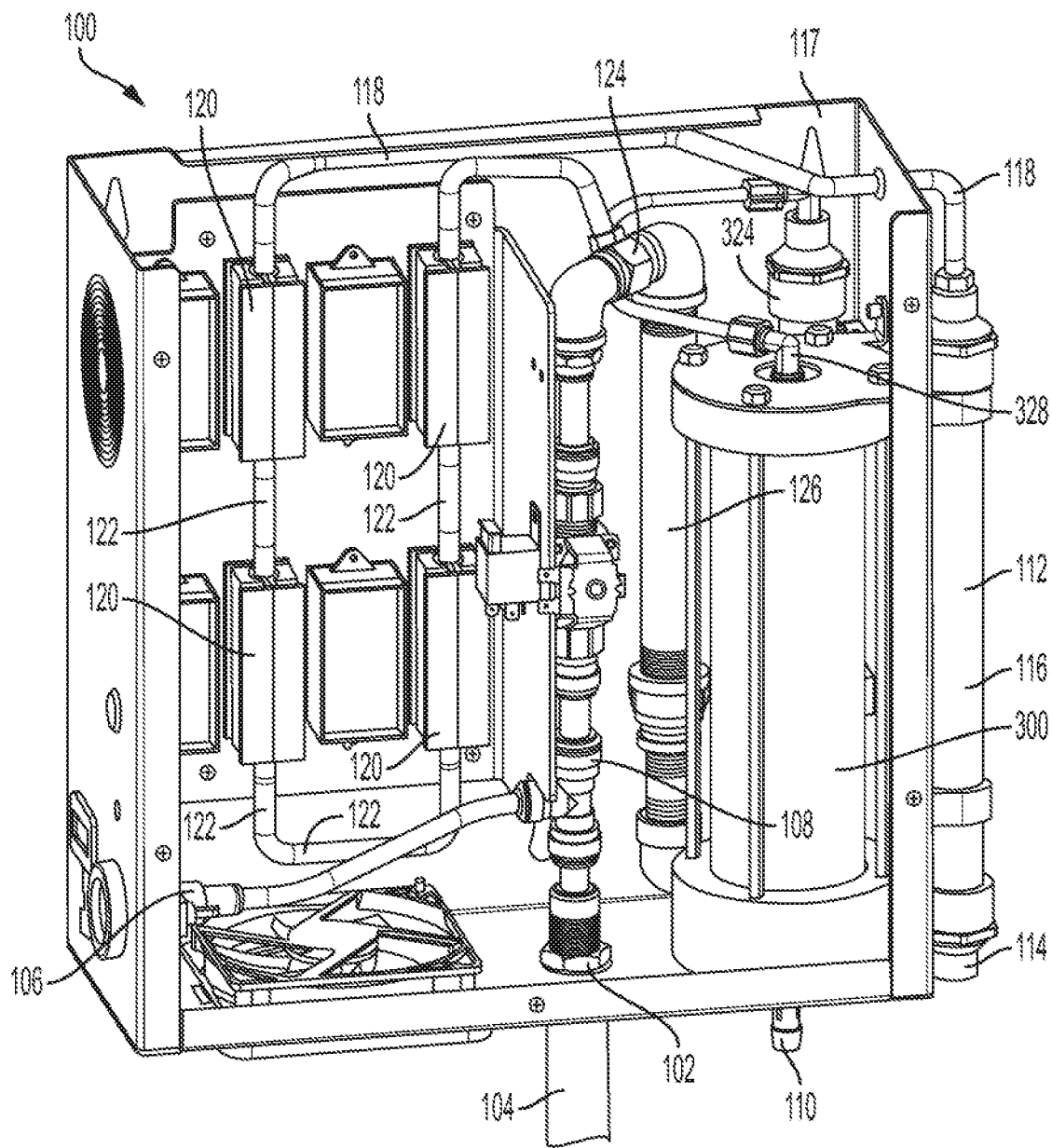
FIG. 1 is a perspective view of a system for generating a water and ozone gas solution in accordance with the subject technology.

The subject technology overcomes many of the prior art problems associated with systems for generating water and ozone gas mixtures for general purpose cleaning. In brief summary, the subject technology provides an ozone solution system which uses a specialized degassing chamber for better efficiency. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Figure 2:
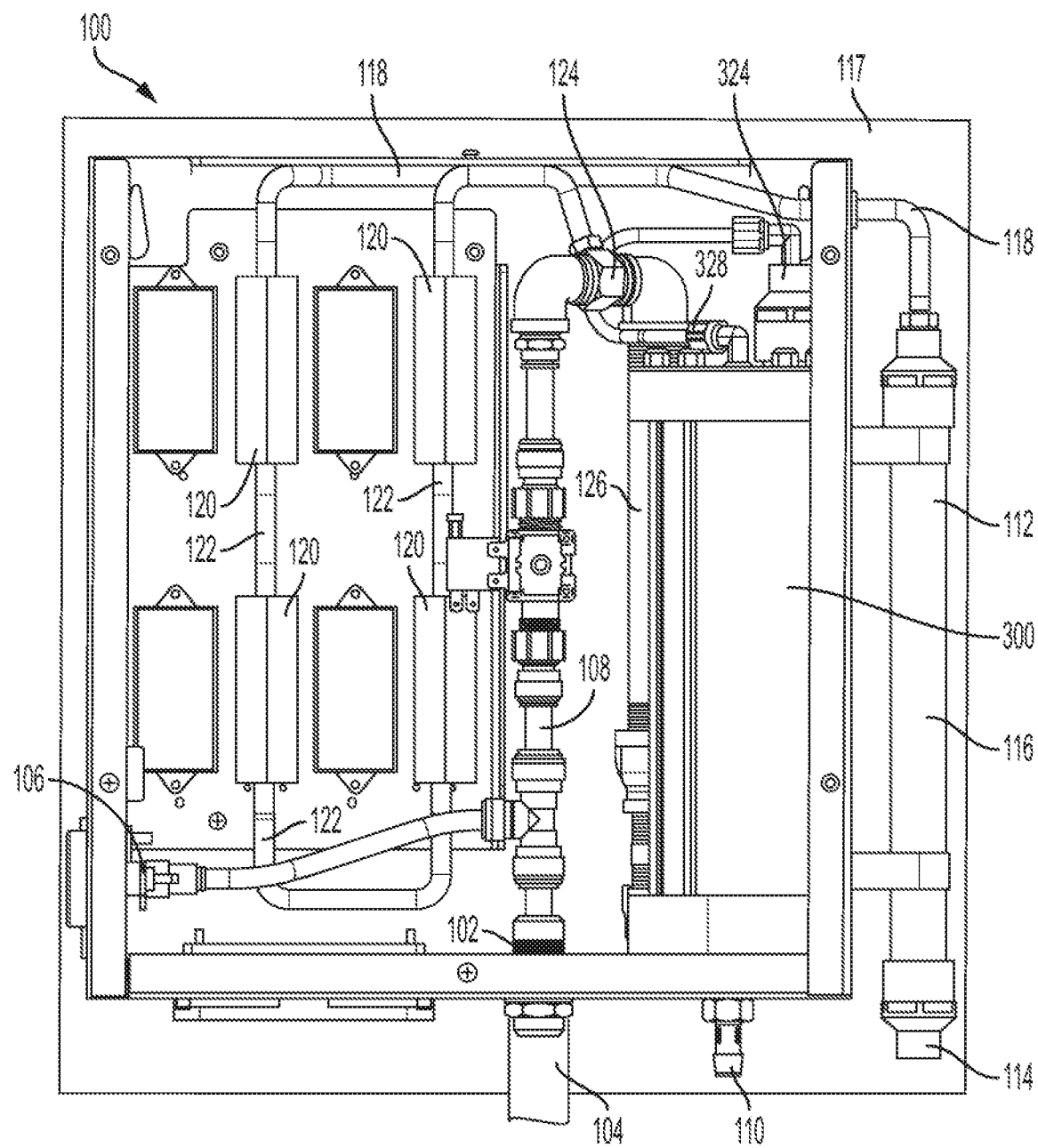
FIG. 2 is a front view of the system of FIG. 1.
Figure 3:
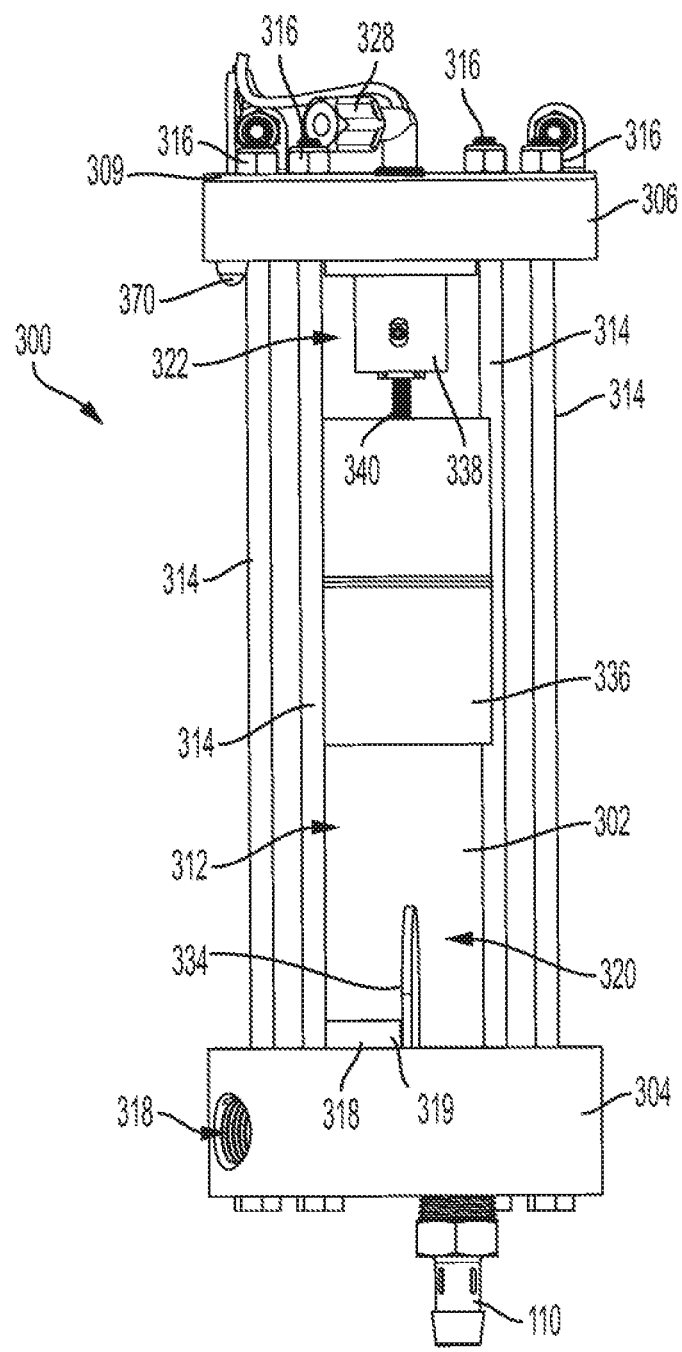
FIG. 3 is a side perspective view of a degassing chamber for the system of FIG. 1.
Figure 4:
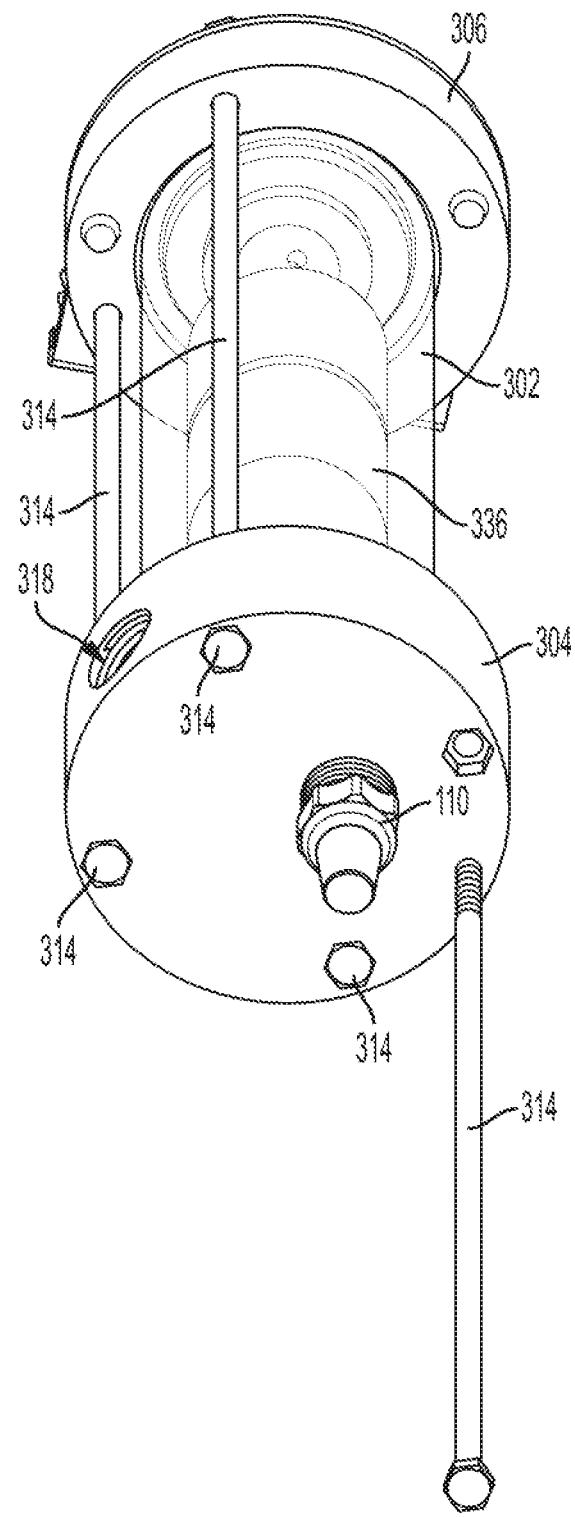
FIG. 4 is a bottom perspective view of the degassing chamber of FIG. 3.
Figure 5:
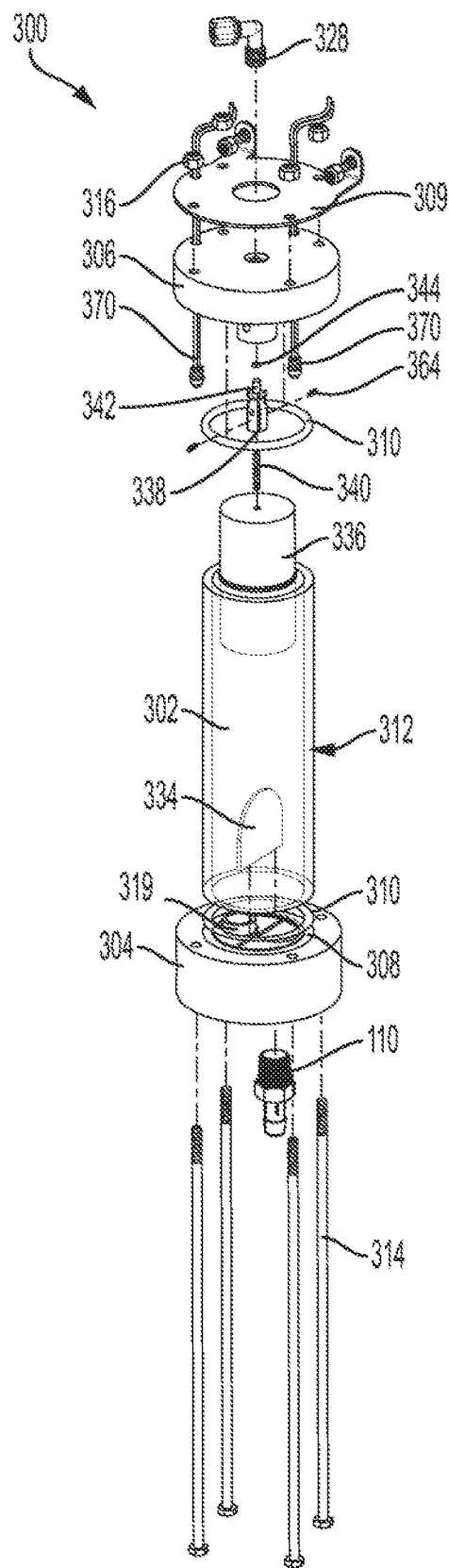
FIG. 5 is an exploded view of the degassing chamber of FIG. 3.
Figure 6:
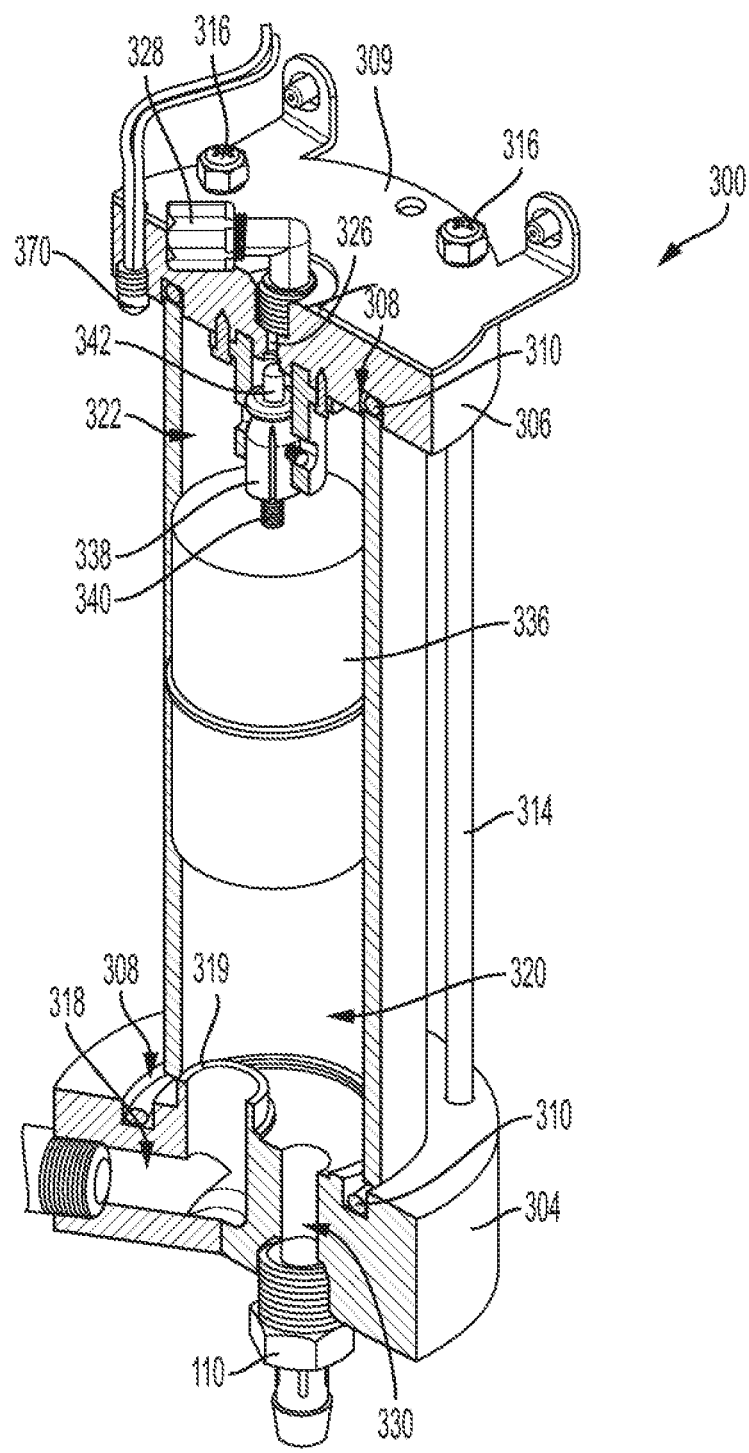
FIG. 6 is a cutout view showing a vertical cross section of the degassing chamber of FIG. 3.
Figure 7:
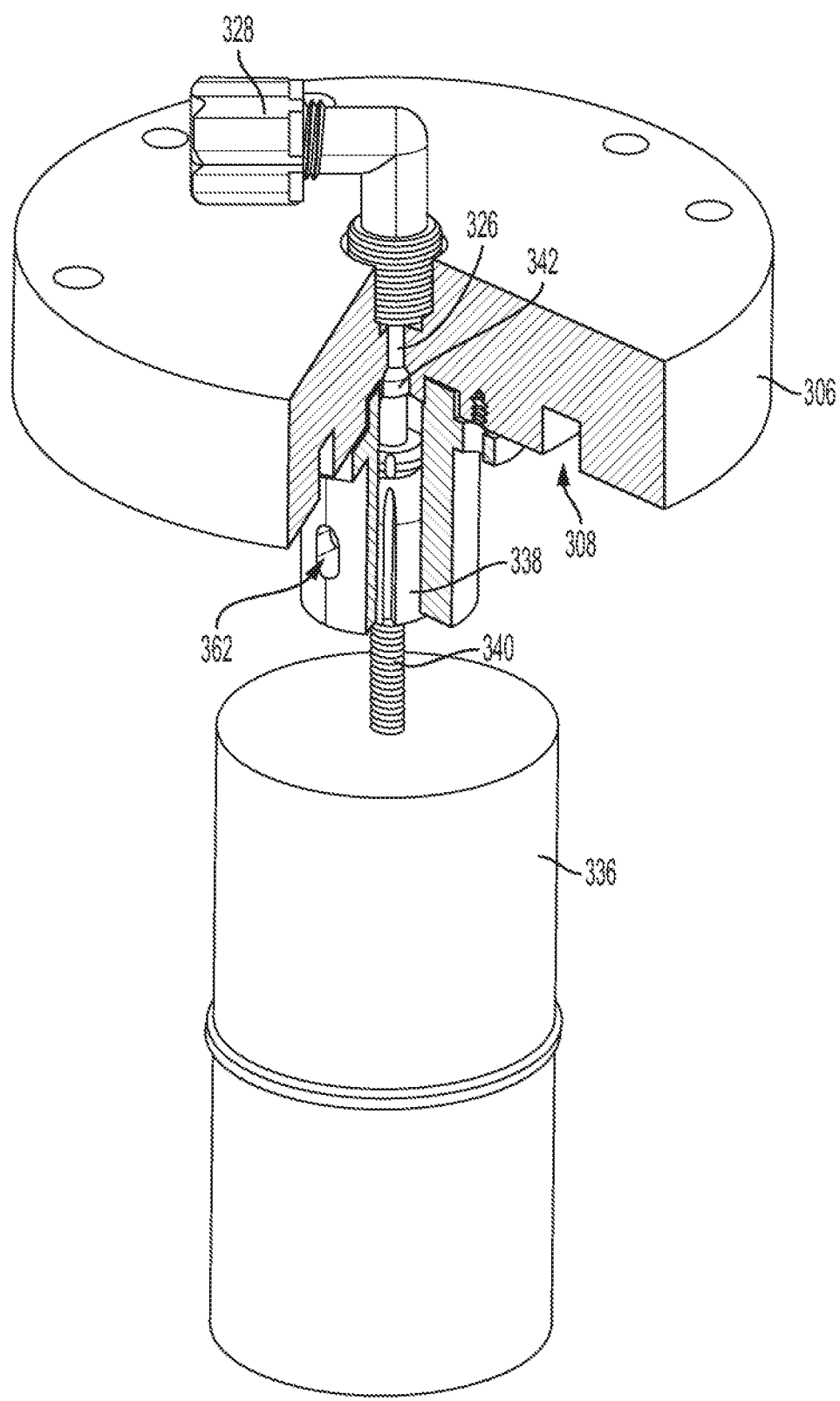
FIG. 7 is a partial cutout view of select components of the degassing chamber of FIG. 3.
Figure 8:
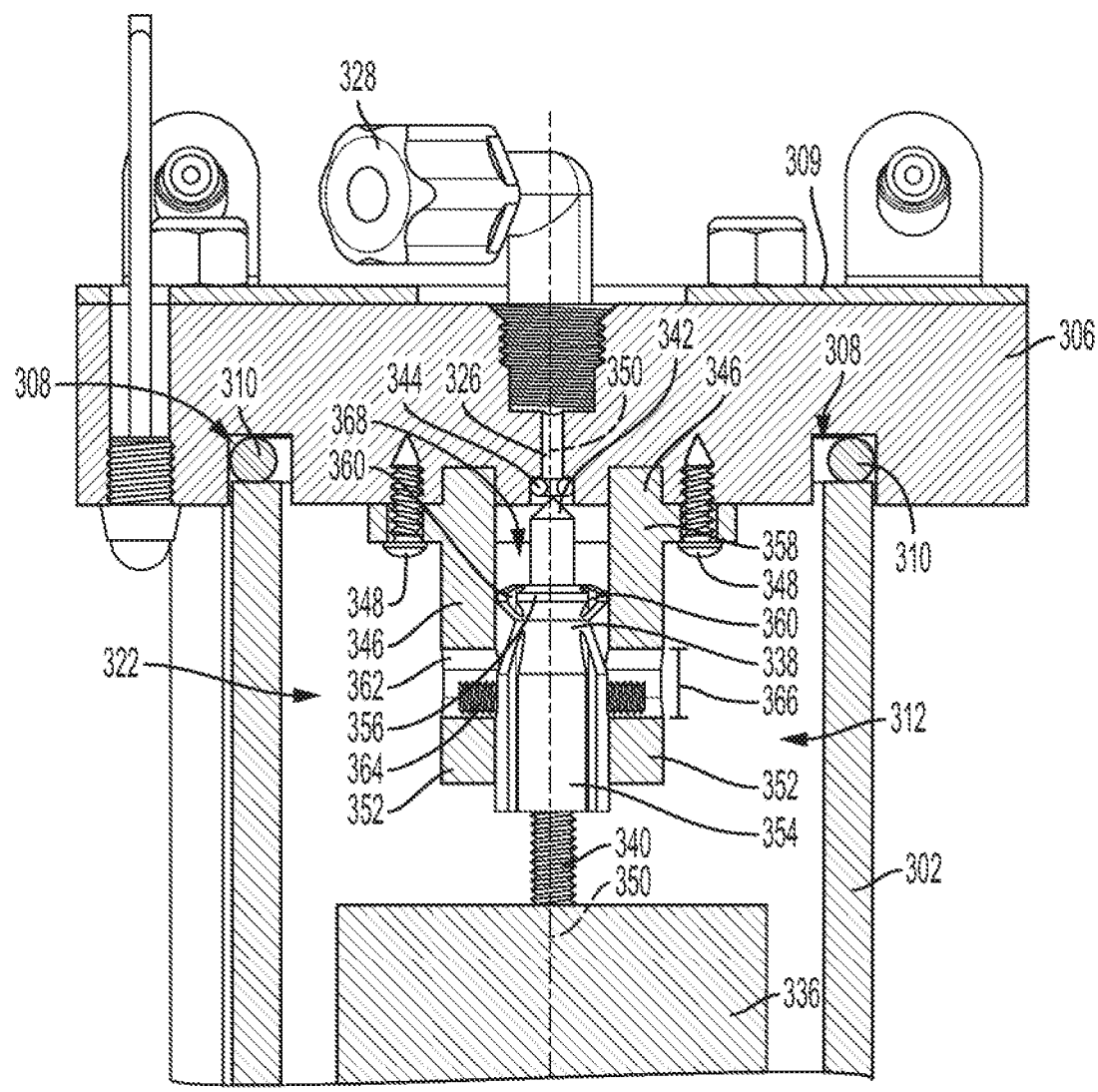
FIG. 8 is a vertical cross sectional view of an upper area of the degassing chamber of FIG. 3.
Figure 9:
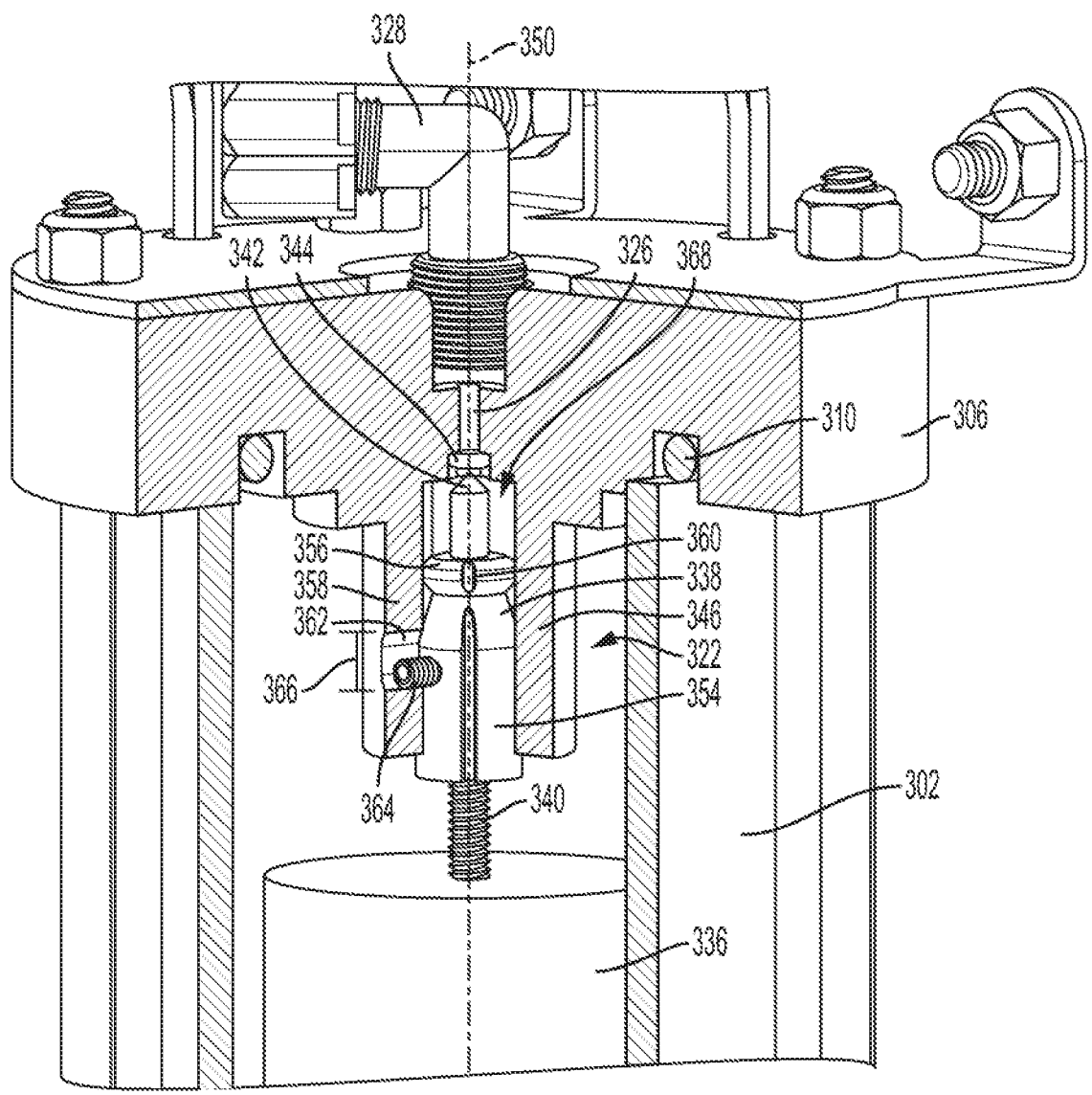
FIG. 9 is a partial cutout view of the upper area of the degassing chamber of FIG. 3 showing a piston in an "open" position.
Figure 10:
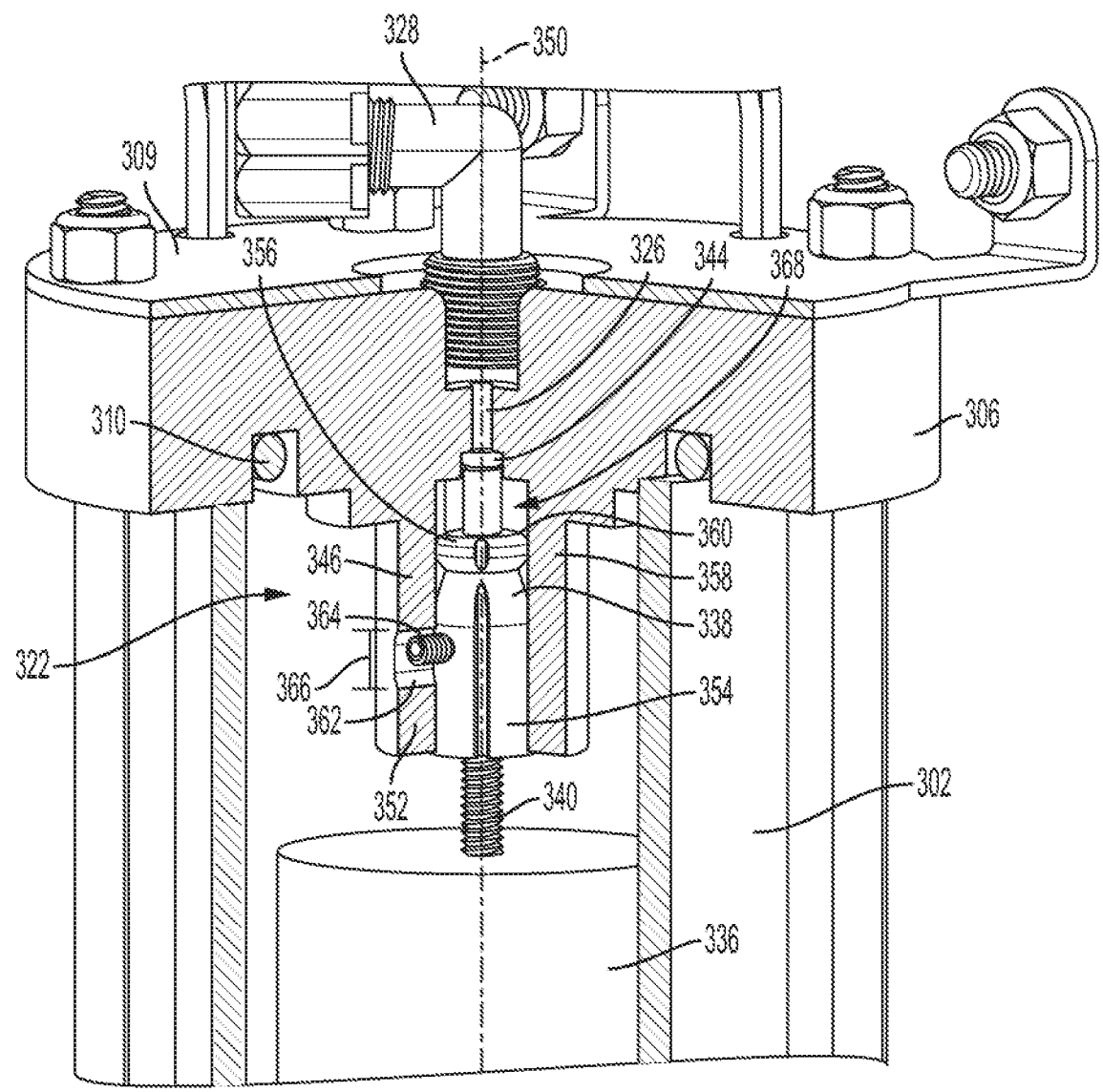
FIG. 10 is a partial cutout view of the upper area of the degassing chamber of FIG. 3 showing the piston in a "closed" position.

Referring now to FIGS. 1-2, an ozone solution system 100 in accordance with the subject technology is shown. The system 100 is an entirely self-contained system for converting regular water from a typical source (e.g. tap water) and air into a water and ozone gas mixture suited for general purpose cleaning. To that end, the system 100 includes an input nozzle 102 configured to connect the system 100 to a single water input line 104 for receiving water. A PSI gauge 106 connects to the intake water piping 108 to provide a pressure measurement of water coming into the system 100. The water passes is injected and mixed with ozone gas before being output through a single mixture output nozzle 110. The water input into the system follows a single continuous route through the system 100 between the input 102 and output 110.

The system 100 also generates ozone gas using outside ambient air which undergoes several treatment stages. Therefore the system 100 can include an air dryer 112, which has an intake 114 configured to draw surrounding air into the air dryer 112. The ambient air is passed through a sealed chamber 116 within the air dryer 112. The chamber 116 houses a molecular sieve, which can be a 13X molecular sieve comprised of less than 60% silicon dioxide, less than 40% aluminum oxide, less than 20% sodium oxide, and less than 5% magnesium oxide. The air passes through the molecular sieve and is cleaned before being fed through air distribution line 118.

Next, the cleaned air passes through ozone generators 120 which convert the ambient air into ozone gas via air distribution line 122. The ozone generators 120 are daisy-chained to create an amount of ozone within the air that will result in the desired aqueous ozone and water mixture once mixed. The intake water piping 118 leads to a connection 124 where the ozone gas from the ozone generators 120 is injected into the water to form a water and aqueous ozone mixture. This mixture then undergoes a mixing stage, in which the mixture is passed through a mixing apparatus 126 to the degas chamber 300. The mixing apparatus 126 is a pipe which contains a helical shaped insertion (not shown distinctly) which causes the water and ozone gas to change direction as they pass through, forcing the water and ozone gas to mix. Typically the mixing apparatus 126 will include no more than 15 continuous helical mixing segments, ensuring the ozone gas and water are sufficiently mixed without overly saturating the water as to produce Whitewater. The mixture is then provided to the degassing apparatus 300, where excess ozone gas is separated from the mixture and broken down, as will be discussed in more detail below. The mixture then exits the degassing chamber 300 and is released from the output nozzle 110. A hose, piping, or the like, can be connected to the output nozzle 110 to redirect the output mixture to a delivery location, as desired. The final mixture is substantially free of excess ozone gas beyond the saturation point of the water within the mixture, and therefore represents a solution which is ready for use as a safe and effective cleaning product.

Referring now to FIGS. 3-11, the degassing chamber 300 for the ozone solution system 100, in accordance with the subject technology, is shown. As described above, the degassing chamber 300 generally removes excess ozone gas from the water and ozone gas mixture before the solution is released from the system 100.

The degassing chamber 300 has a central body formed by a cylindrical sidewall 302. The sidewall 302 is capped, on opposing ends, by a bottom cap 304 and a top cap 306, each of which extend beyond the diameter of the sidewall 302. Each cap 304, 306 includes grooves 308 shaped to accommodate an end of the cylindrical sidewall 302. Opposite ends of the cylindrical sidewall 302 are seated within the grooves 308 of the corresponding end cap 304, 306. O-rings 310 are included within the grooves 308 to provide a tight seal between the sidewall 302 and end caps 304, 306. Together, the sidewall 302 and end caps 304, 306 define a cavity 312 for containing water and ozone gas that is generally hermetically sealed, aside from designed inlets and outlets. Four hex head screws 314 connect the bottom cap 304 and top cap 306. Bolts 316 attach the hex head screws 314 to the caps 304, 306 outside the circumference of the sidewall 302, allowing the screws 314 to run the entire length of the sidewall 302 without interfering with the cavity 312. The bolts 316 additionally hold an aluminum mounting plate 309 directly against the top of the top cap 306, rigidly connecting the mounting plate 309 and top cap 306. This mounting plate 309 allows the degas chamber 300 to be easily connected to a rigid outer housing 117 of the solution system 100. Similarly, this connection allows the degas chamber 300 to be quickly disconnected from the solution system 100, as may be helpful for routine maintenance and/or part replacement.

A mixture of water and ozone gas enters the cavity 312 through an inlet 318 which directs the mixture through the bottom cap 304 into a lower mixture area 320. At this point, the incoming mixture tends to include an amount of ozone gas exceeding the absolute saturation point of water within the mixture. The degassing chamber 300 relies on gravity to separate excess ozone gas from the mixture, as excess ozone gas will generally rise from the mixture area 320 into an upper ozone gas area 322. An upper ozone outlet 326 diverts excess ozone gas from the ozone area 322, out the upper end of the cavity 312 via the top cap 306, through an outlet nozzle 328 and to an ozone destruct 324 (See FIGS. 1-2). The ozone destruct 324 contains a destruct catalyst, such as Manganese Dioxide or Copper Oxide, which breaks down the excess ozone gas and releases oxygen back to the atmosphere. A mixture outlet 330 on the bottom cap 304 offset from the mixture inlet 318, delivers the mixture through an outlet nozzle 110 to an output line for the ozone system 100, the output water/ozone mixture being suitable for use as a general purpose cleaning agent. Since the mixture inlet 318 and outlet 330 are both located on the bottom cap 304, a mechanical divider 334 is between the inlet 318 and outlet 330. The divider 334 diverts incoming mixture towards the central area of the cavity 312, blocking a direct path between the inlet 318 and outlet 330. This forces the mixture into the cavity 312, preventing the mixture from immediately exiting from the outlet 330 after entry, and allowing time to pass for the excess ozone gas to separate within the cavity 312. Further, the inlet 318 can include a raised lip 319 which is raised off the surface of the bottom cap 304 within the cavity 312. The raised lip 319 serves a similar function of the divider 334, which is ensuring that the solution entering the degas chamber 300 is guided into the cavity 312 such that it doesn't immediately leave through the outlet 330. As such, the raised lip 319 can be used in addition, or as an alternative to, the divider 334.

Release of ozone gas from the ozone outlet 326 is controlled by a combination of a cylindrical float 336 and a piston 338. A connecting rod 340, which can be stainless steel, mechanically and rigidly connects the piston 338 to the float 336 such that the piston 338 and the float 336 move together. The piston 338 moves between a closed position and an open position based on movement of the float 336 (movement of the float 336 being controlled by the mixture level within the chamber 312). Upward movement of the piston 338 causes the piston 338 to move into the closed position (shown in FIG. 10), in which the tip 342 of the piston 338 engages an O-ring 344 to seal the ozone outlet 326. From the closed position, downward movement of the piston 338 causes the tip 342 of the piston 338 to disengage from the O-ring 344 and opens a channel between the ozone outlet 326 and the ozone area 322. When a channel is open to allow excess ozone gas to be released through the ozone outlet 326, the piston 338 is in the open position (shown in FIG. 9).

A central piston housing 346 is attached to the top cap 306 around the ozone outlet 326 by screws 348. The central piston housing 346 retains the piston 338 and restricts its movement to directly up and down along the central axis 350 the cavity 312. In particular, the piston 338 includes a skirt 352 in direct contact with the body 354 of the piston 338. The piston 338 also includes an upper guide 356 which is guided by an upper portion 358 of the piston housing 346. The upper guide 356 can include openings 360 to allow ozone gas to pass therethrough. Further, since the piston 338 is attached to the float 336, the piston housing 346 keeps the float 336 centrally positioned within the cavity 312, creating a cylindrical channel around the entire circumference of the float 336. The piston housing 346 also includes side openings 362 which provide a channel from the ozone area 322 into the interior of the piston housing 346 and to the ozone outlet 326. Side screws 364 extend horizontally (i.e. orthogonal to the central axis of the degas chamber) from the body 354 of the piston 338. The height 366 of the side openings 362 restrict the vertical movement of the set screws 364, and therefore the piston 338 and the float 336, to within a given range along the central axis 350. Therefore even when there is no mixture present in the degassing chamber 300, the float 336 will remain centrally within the cavity 312, rather than sinking to the bottom. Further, when the piston 338 is in the closed position (FIG. 10), the body of the piston 354 seals the side openings 362 from the inner chamber 368 of the piston housing 346, providing an additional seal to prevent the release of ozone gas in the ozone area 322 from the ozone outlet 326.

Movement of the piston 338 is controlled by movement of the float 336 within the cavity 312. The float 336 is buoyant, and is driven upward when the mixture within the cavity 312 reaches a given volume. In general, the mixture column will rise within the cavity 312 until it reaches the float 336. The mixture column then continues to rise around the outer circumference of the float 336, toward the ozone mixture area 322. In some cases, the float is designed with a buoyancy that results in the float 336 rising once the mixture column reaches a midway point of the float 336. Thus, the mixture column initially causes the float 336 to rise, forcing the piston 338 to seal the ozone outlet 326. As the mixture begins to fill up the cavity 312, excess ozone gas is released, around the float 336, into the ozone area 322. Pressure from the excess ozone gas builds in the ozone area 322, and eventually drives the mixture column downward, causing the float 336, and therefore the piston 338, to move downward accordingly. The downward movement of the piston 338 results in the piston 338 disengaging from the ozone outlet 326 and opens the channel between the ozone area 322 and the ozone outlet 326. The pressure within the ozone area 322 then forces the excess ozone gas out the ozone outlet 326 and into the ozone destruct 324, where the ozone gas is broken down.

In some cases, the sidewall 302 of the degas chamber can be a clear PVC material, allowing for easy viewing of the degas process inside the chamber, as well as easy inspection of the interior parts. LEDs 370 can be fixed within the top cap to help visualize the chamber, or simply for aesthetics.

Figure 11:
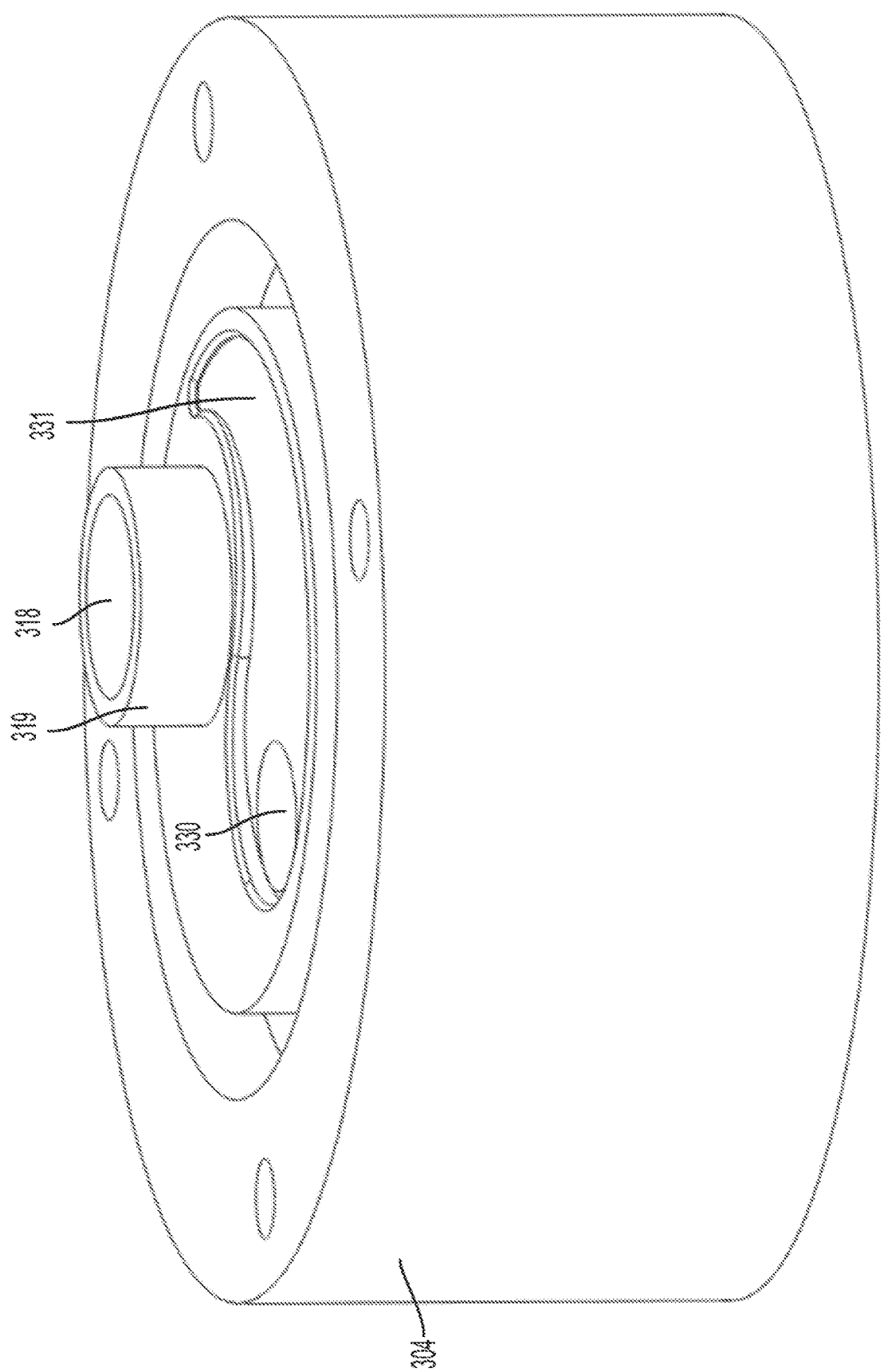
FIG. 11 is a front perspective view of an embodiment of a bottom cap for the degassing chamber of FIG. 3.

Referring now to FIG. 11, another embodiment of the bottom cap 304 is shown. The bottom cap 304 of FIG. 11 includes a sloped cutout 331 on the upper surface of the bottom cap 304 which acts as a drain ramp, directing mixture from the cavity 312 to the outlet 330. The sloped cutout 331 allows the degas chamber 300 to completely drain even when the system 100 is turned off. In some cases, it has been found advantageous for the sloped cutout 331 to have a slope of between 10-20 degrees and/or 15 degrees. However, it should be understood that other slopes can also be used.

Overall, the degas chamber 300 is designed for optimal efficiency, allowing excess ozone gas to be quickly released from the mixture without slowing down the flow of the mixture through the system 100. In this way, potential concerns related to excess ozone gas being contained in the final mixture are avoided. This is accomplished by many features of the degas chamber 300, as described above, including the design of the centrally positioned float 336 and piston 338. By providing a buoyant cylindrical float 336 which allows ozone gas to pass around the entire circumference of the float 336 in all positions, the degas chamber 300 maximizing the release of excess ozone gas from the mixture and reduces the required retention time of mixture within the degas chamber 300. Since the float 336 moves directly up and down along the central chamber axis 350, the position of the float 336 rises uniformly with the rise of mixture and/or the increase is ozone gas. The float 336 and piston 338 mechanism also requires no other separate mechanical moving parts, such as hinges or standalone pins or connectors, which have the potential to fail, resulting in a possible hazard situation. Additionally, movement of the float 336 and piston 338 is controlled entirely by the mixture column level and ozone gas pressure, and therefore the degas chamber 300 requires no power source to operate. As such, the degas chamber 300 provides a simple and effective means of safely removing excess ozone gas from the water and ozone gas mixture, allowing the system 100 to generate a water and ozone gas mixture that is suitable as a general purpose cleaner.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A degassing chamber, comprising:
a housing having a cylindrical sidewall defining a cavity between an upper end and a lower end, the cavity including a mixture area proximate the lower end and an ozone area proximate the upper end, wherein the upper end of the housing comprises a cylindrical top cap;
an inlet configured to deliver a mixture of water and ozone gas to the mixture area through the lower end;
a cylindrical float positioned within the cavity and configured to move along a central axis of the cavity, wherein the cylindrical float is buoyant with respect to the mixture, the mixture forming a column around the cylindrical float and excess ozone gas from the mixture being directed past the cylindrical float to pool within the ozone area;
an ozone outlet configured to divert ozone gas from the ozone area out the upper end;
a piston connected to the cylindrical float to move simultaneously with the cylindrical float, wherein: when the column of the mixture rises above a threshold, the piston moves into a closed position in which the piston seals the ozone outlet; and when the column of the mixture is below the threshold, the piston moves into an open position in which the piston allows ozone gas from the ozone area to exit through the ozone outlet;
a piston housing surrounding the piston within the cavity and centrally attached to the cylindrical top cap around the ozone outlet, the piston housing including a plurality of side openings into the piston housing, the side openings providing a channel between the ozone area and the ozone outlet when the piston is in the open position, wherein the piston is configured to seal the side openings in the closed position; and
a mixture outlet configured to divert the mixture from the mixture area and out the lower end,
wherein the degassing chamber is configured such that an ozone gas pressure builds up in the ozone region over time such that the column of the mixture is eventually driven downward by the ozone gas pressure.

2. The degassing chamber of claim 1, further comprising a divider connected to the lower end and positioned to divert water towards the cylindrical float, the divider blocking a direct path between the inlet and mixture outlet.

3. The degassing chamber of claim 1, wherein:
the lower end of the housing comprises a cylindrical bottom cap having a diameter greater than a diameter of the cylindrical sidewall, the cylindrical bottom cap including a lower groove, wherein a lower end of the cylindrical sidewall is seated within the lower groove; and
the cylindrical top cap has a diameter greater than the diameter of the cylindrical sidewall, the cylindrical top cap including an upper groove, wherein an upper end of the cylindrical sidewall is seated within the upper groove.

4. The degassing chamber of claim 3, further comprising:
a lower O-ring positioned within the lower groove to seal the lower end of the cylindrical sidewall to the cylindrical bottom cap; and
an upper O-ring positioned within the upper groove to seal the upper end of the cylindrical sidewall to the cylindrical top cap.

5. The degassing chamber of claim 1, further comprising a piston skirt of the piston housing configured to guide the piston along the central axis.

6. The degassing chamber of claim 5 wherein the piston includes a plurality of set screws extending orthogonal to the central axis and into the side openings of the piston housing, the set screws restricting movement of the cylindrical float within a range along the central axis.

7. The degassing chamber of claim 1 further comprising a connecting rod extending along the central axis between the cylindrical float and the piston, the connecting rod rigidly connecting the cylindrical float and piston.

8. The degassing chamber of claim 1, wherein the cylindrical float is buoyant such that the cylindrical float is configured to rise when the mixture reaches a midway point of the cylindrical float.

9. The degassing chamber of claim 1, further comprising an ozone destruct, the ozone outlet diverting ozone gas from ozone area to the ozone destruct, the ozone destruct containing a destruct catalyst and configured to break down the ozone gas with the destruct catalyst and release oxygen.

10. The degassing chamber of claim 1, wherein the inlet includes a raised lip extending into the cavity and configured to guide the mixture into the cavity.

11. An ozone solution system comprising:
a single water input line configured to route water into the ozone solution system;
a single air intake configured to route air into the ozone solution system;
one or more air treatment stages configured to treat the air and generate ozone gas;
one or more water treatment stages configured to mix the water with the ozone gas to create a mixture of water and ozone gas;
a degassing chamber, including:
a housing having a cylindrical sidewall defining a cavity between an upper end and a lower end, the cavity including a mixture area proximate the lower end and an ozone area proximate the upper end, wherein the upper end of the housing comprises a cylindrical top cap;
an inlet configured to deliver the mixture of water and ozone gas to the mixture area through the lower end;
a cylindrical float positioned within the cavity and configured to move along a central axis of the cavity, wherein the cylindrical float is buoyant with respect to the mixture, the mixture forming a column around the cylindrical float and excess ozone gas from the mixture being directed past the cylindrical float to pool within the ozone area;
an ozone outlet configured to divert ozone gas from the ozone area out the upper end;
a piston connected to the cylindrical float to move simultaneously with the cylindrical float, wherein:
when the column of the mixture rises above a threshold, the piston moves into a closed position in which the piston seals the ozone outlet; and when the column of the mixture is below the threshold, the piston moves into an open position in which the piston allows ozone gas from the ozone area to exit through the ozone outlet;
a piston housing surrounding the piston within the cavity and centrally attached to the cylindrical top cap around the ozone outlet, the piston housing including a plurality of side openings into the piston housing, the side openings providing a channel between the ozone area and the ozone outlet when the piston is in the open position, wherein the piston is configured to seal the side openings in the closed position; and
a mixture outlet configured to divert the mixture from the mixture area and out the lower end,
wherein; the degassing chamber is configured such that an ozone gas pressure builds up in the ozone region over time such that the column of the mixture is eventually driven downward by the ozone gas pressure; and
a single mixture output line configured to route the mixture from the degassing chamber out of the ozone solution system.

12. The ozone solution system of claim 11, wherein the degassing chamber further comprises a divider connected to the lower end and positioned to divert water towards the cylindrical float, the divider blocking a direct path between the inlet and mixture outlet.

13. The ozone solution system of claim 11, wherein:
the lower end of the housing comprises a cylindrical bottom cap having a diameter greater than a diameter of the cylindrical sidewall, the cylindrical bottom cap including a lower groove, wherein a lower end of the cylindrical sidewall is seated within the lower groove; and
the top cap has a diameter greater than the diameter of the cylindrical sidewall, the cylindrical top cap including an upper groove, wherein an upper end of the cylindrical sidewall is seated within the upper groove.

14. The ozone solution system of claim 13, wherein the degassing chamber further comprises:
a lower O-ring positioned within the lower groove to seal the lower end of the cylindrical sidewall to the cylindrical bottom cap; and
an upper O-ring positioned within the upper groove to seal the upper end of the cylindrical sidewall to the cylindrical top cap.

15. The ozone solution system of claim 11, wherein the degassing chamber further comprises:
a piston skirt of the piston housing configured to guide the piston along the central axis.

16. The ozone solution system of claim 15, wherein the piston includes a plurality of set screws extending orthogonal to the central axis and into the side openings of the piston housing, the set screws restricting movement of the cylindrical float within a range along the central axis.

17. The ozone solution system of claim 11, wherein the degassing chamber further comprises a connecting rod extending along the central axis between the cylindrical float and the piston, the connecting rod rigidly connecting the cylindrical float and piston.

18. The ozone solution system of claim 11, wherein the cylindrical float is buoyant such that the cylindrical float is configured to rise when the mixture reaches a midway point of the cylindrical float.

19. The ozone solution system of claim 11, further comprising an ozone destruct, the ozone outlet diverting ozone gas from ozone area to the ozone destruct, the ozone destruct containing a destruct catalyst and configured to break down the ozone gas with the destruct catalyst and release oxygen.

20. The ozone solution system of claim 13, wherein:
the inlet includes a raised lip extending into the cavity and configured to guide the mixture into the cavity; and
an upper surface of the bottom cap includes a sloped cutout sloping towards the outlet.

* * * * *